United States Patent
Waye et al.

(10) Patent No.: US 10,359,047 B2
(45) Date of Patent: Jul. 23, 2019

(54) ELONGATED PERMANENT RING MANAGEMENT WITH A PLURALITY OF AXIALLY DIRECTED MAGNETIZED ZONES AND MAGNETIC BEARING WITH SUCH A RING MAGNET

(71) Applicant: Edwards Limited, Burgess Hill, West Sussex (GB)

(72) Inventors: Andrew Waye, Forest Row (GB); Barrie Dudley Brewster, Brighton (GB)

(73) Assignee: Edwards Limited, Burgess Hill, West Sussex (GB)

( * ) Notice: Subject to any disclaimer, the term of this patent is extended or adjusted under 35 U.S.C. 154(b) by 98 days.

(21) Appl. No.: 15/311,887

(22) PCT Filed: May 5, 2015

(86) PCT No.: PCT/GB2015/051309
§ 371 (c)(1),
(2) Date: Nov. 17, 2016

(87) PCT Pub. No.: WO2015/177504
PCT Pub. Date: Nov. 26, 2015

(65) Prior Publication Data
US 2017/0089351 A1    Mar. 30, 2017

(30) Foreign Application Priority Data
May 20, 2014   (GB) .................................. 1408899.1

(51) Int. Cl.
*F04D 29/058*   (2006.01)
*H02K 7/09*     (2006.01)
(Continued)

(52) U.S. Cl.
CPC ......... *F04D 29/058* (2013.01); *F04D 19/048* (2013.01); *F16C 32/0425* (2013.01);
(Continued)

(58) Field of Classification Search
CPC .. F04D 29/058; F04D 19/048; F16C 32/0425; F16C 2360/45; H01F 7/021; H02K 7/09
See application file for complete search history.

(56) References Cited

U.S. PATENT DOCUMENTS 2,340,122 A      1/1944   Hansen, Jr.
3,899,223 A  *   8/1975   Baermann ........... F16C 32/0427
                                                    310/90.5
(Continued)

FOREIGN PATENT DOCUMENTS

DE      10239958        3/2003
DE      102007017644    10/2008
(Continued)

OTHER PUBLICATIONS

British Search Report and Examination Report dated Nov. 18, 2014 for corresponding British Application No. GB1408899.1.
(Continued)

*Primary Examiner* — Emily P Pham
(74) *Attorney, Agent, or Firm* — Theodore M. Magee; Westman, Champlin & Koehler, P.A.

(57) ABSTRACT

The present invention is directed to a magnet for a magnetic bearing arrangement, a bearing arrangement comprising said magnet, and a vacuum pump comprising said bearing arrangement. In particular the invention can be particularly useful in a magnetic bearing arrangement that reduces stray magnetic fields for a turbomolecular vacuum pump, although it is understood that the invention is not limited to this field and other applications will be understood by the skilled person.

4 Claims, 3 Drawing Sheets

(51) Int. Cl.
  *F16C 32/04*    (2006.01)
  *H01F 7/02*     (2006.01)
  *F04D 19/04*    (2006.01)

(52) U.S. Cl.
  CPC ............... *H01F 7/021* (2013.01); *H02K 7/09* (2013.01); *F16C 2360/45* (2013.01)

(56) References Cited

U.S. PATENT DOCUMENTS

| | | | | |
|---|---|---|---|---|
| 4,939,120 | A * | 7/1990 | Moon | F16C 32/0438 |
| | | | | 310/52 |
| 9,464,667 | B2 * | 10/2016 | Brewster | F16C 32/0425 |
| 2002/0070617 | A1 * | 6/2002 | Kanebako | H02K 7/09 |
| | | | | 310/90.5 |
| 2002/0074881 | A1 * | 6/2002 | Imlach | F16C 27/06 |
| | | | | 310/90.5 |
| 2004/0189123 | A1 * | 9/2004 | Nusser | F16C 32/0406 |
| | | | | 310/90.5 |
| 2004/0227421 | A1 | 11/2004 | Wang et al. | |
| 2009/0039995 | A1 * | 2/2009 | Kipp | F16C 32/0408 |
| | | | | 335/304 |
| 2011/0266904 | A1 * | 11/2011 | Stefanini | H01F 7/0242 |
| | | | | 310/152 |

FOREIGN PATENT DOCUMENTS

| | | |
|---|---|---|
| EP | 1477695 | 11/2004 |
| EP | 2705263 A1 | 3/2014 |
| EP | 2708753 | 3/2014 |
| JP | S6159964 U | 4/1986 |
| JP | H04219493 A | 8/1992 |
| JP | H11325075 | 11/1999 |
| JP | 2008118002 A | 5/2008 |
| JP | 2011029215 A | 2/2011 |
| WO | 2012153109 A2 | 11/2012 |

OTHER PUBLICATIONS

International Search Report and Written Opinion dated Oct. 19, 2015 in corresponding International Application No. PCT/GB2015/051309, 11 pgs.

Notification of Reason for Rejection dated Jan. 31, 2019 for corresponding Japanese Application No. JP2016568545.

* cited by examiner

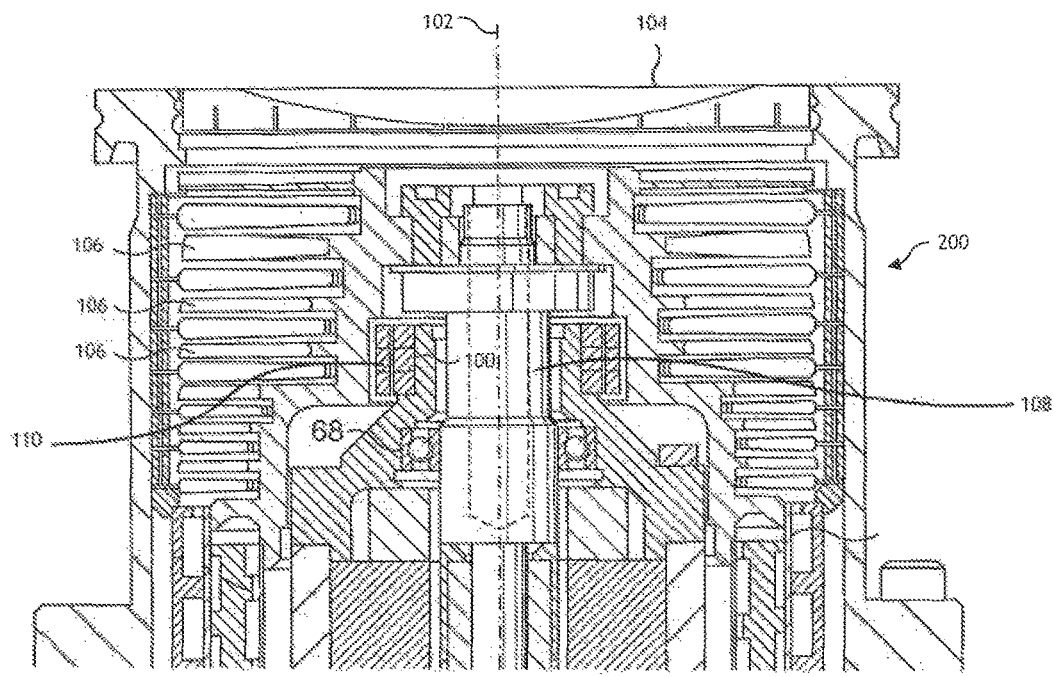
Fig. 1-PRIOR ART
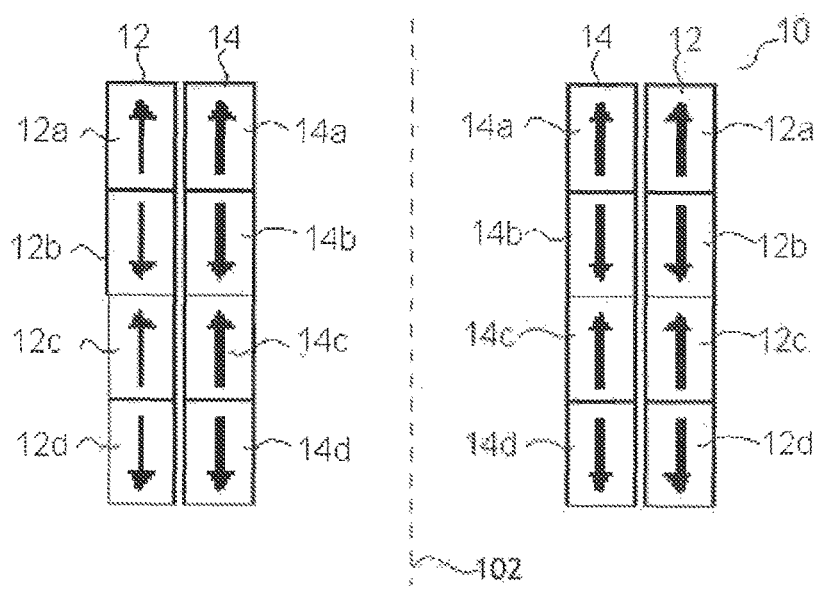
Fig. 2
PRIOR ART

ELONGATED PERMANENT RING MANAGEMENT WITH A PLURALITY OF AXIALLY DIRECTED MAGNETIZED ZONES AND MAGNETIC BEARING WITH SUCH A RING MAGNET

This application is a national stage entry under 35 U.S.C. § 371 of International Application No. PCT/GB2015/051309, filed May 5, 2015, the entire content of which is incorporated herein by reference.

TECHNICAL FIELD OF THE INVENTION

The present invention is directed to a magnet for a magnetic bearing arrangement, a bearing arrangement comprising said magnet, and a vacuum pump comprising said bearing arrangement. In particular the invention can be particularly useful in a magnetic bearing arrangement that reduces stray magnetic fields for a turbomolecular vacuum pump, although it is understood that the invention is not limited to this field and other applications will be understood by the skilled person.

The present invention is described below with respect to a specific application. However, it is understood that the invention is not limited to turbomolecular vacuum pumps.

BACKGROUND TO THE INVENTION

Turbomolecular pumps are often employed as a component of the vacuum system used to evacuate devices such as scanning electron microscopes (SEMs) and lithography devices.

It is common for said turbomolecular pumps to comprise an oil free, passive permanent magnetic bearing arrangement, located in the high vacuum end of the pump, to provide a substantially friction free, dry bearing arrangement free of lubricating materials that might otherwise cause contamination in the evacuated volume.

As described in EP2705263, known arrangements of passive permanent magnetic bearings employ a plurality of individual axially stacked ring magnets. Examples of such arrangements are shown in FIGS. 1 and 2.

FIG. 1 illustrates a section of a typical turbomolecular pump 200 comprising a series of rotor blades 106 extending outwardly from a rotor shaft 108. A passive magnetic bearing arrangement 100, 110 is located at the high vacuum (inlet) end of the shaft 108. The bearing arrangement 100, 110 comprises a series of three individual permanent magnet rings 100 fixed to the pump housing surrounded concentrically by a series of three individual permanent magnet rings 110 which are fixed to, and rotate with, the rotor arrangement 106, 108 about the axis 102.

A cross section of a further example of a passive permanent magnetic bearing arrangement 10 for a turbomolecular pump (not shown) is illustrated in more detail in FIG. 2. In this example the bearing arrangement 10 comprises an array 12 of four outer rotating permanent magnet rings 12a, 12b, 12c and 12d and an array 14 of four inner non-rotating permanent magnetic rings 14a, 14b, 14c and 14d arranged such that the outer, rotating, array 12 surrounds the inner, static, array 14 in a concentric manner. The magnets are all formed of rare earth magnetic material, such as samarium-cobalt. The outer array 12 is attached to the rotor of a turbomolecular pump (not shown) with the static array 14 attached to the stator of said pump. For reasons of mechanical strength and practical construction, it is normal for the outer array of rings to form the rotating part of the bearing arrangement and the inner rings to form the stationary part.

In this example the magnetisation, (that is, the polarization), of the magnetic rings 12a to 12d and 14a to 14d in each array 12, 14 respectively is substantially aligned with the axis of rotation 102 of the pump rotor (not shown). The direction of magnetisation (polarization) has been indicated by the arrows, with the head of each arrow indicating the north pole.

The magnets are arranged within each array such that they are in mutual repulsion with each other; that is proximate magnets in an array meet their nearest neighbouring magnet in the same array with the same pole (e.g. magnets 12a and 12b meet each other with their south poles). The outer magnetic rings 12a, 12d, 14a, 14d in each array have their north poles facing outermost.

The magnets 12a to 12d and 14a to 14d in each array 12, 14 of the arrangement 10 are orientated to provide a mutual repulsion between the arrays 12, 14 and therefore create an almost frictionless bearing.

A great many other configurations are possible, using different numbers of rings, with axial or radial magnetisation, and arranged for either repulsive or attractive forces between rotor and stator. Although a variety of configurations are possible, they all perform optimally when the direction of magnetisation in the rings is perfectly symmetrical with respect to their rotational axis 102.

The magnetisation in the rings 12a to 12d of the rotating array 12 is shown in FIG. 2 as perfectly symmetrical with respect to their geometric (rotational) axis 102. However, in reality, the axial magnetisation of each magnetic ring 12a to 12d (and, similarly, for magnets 14a to 14d) is imperfect due to the practical limitations of their manufacturing process.

Although the production of magnets is well known to those skilled in the art, in order to illustrate how the imperfections in the process arise and cause problems in turbomolecular pumps, a simplified version will be described herein.

The most common method of producing magnets is via powder metallurgy. The process starts by forming a fine powder which is then compacted and sintered together, before being charged, or magnetized.

The fine powder, which is formed by several steps, is provided with a specific particle size to contain material with one preferred magnetic orientation.

Following the formation of the powder it is compacted to the desired shape. The two well-known techniques used for this process are axial/transverse pressing and isostatic pressing. Both methods essentially involve aligning and fixing the particles so all the magnetic regions in the finished magnet are pointing in a single direction.

In axial/transverse pressing, the powder is placed into a rigid cavity shaped to match the shape of the final magnet and then and compressed with a pressing tool. Before the compression occurs, an aligning magnetic field is applied to the powder to ensure that all the particles are aligned in the same direction. The act of compression fixes, or "freezes-in" this alignment.

Isostatic pressing is where a flexible container is filled with the powder, the container is then sealed, and an aligning field applied. The container is then isostatically pressed using a hydraulic fluid (e.g. water), thus, pressure is applied to the outside of the sealed container, compacting it equally on all sides. By isostatic pressing it is both possible to make large magnets and, because the compacting pressure is applied equally on all sides ensuring the powder remains in relatively good alignment, with relatively high magnetic energy.

The pressed parts are then sintered in a vacuum sintering furnace, with the temperature and atmosphere around the magnet being specified dependent on the type and grade of magnet being produced. Rare earth materials are heated to a sintering temperature and allowed to densify over time. The SmCo magnets used in the above examples have the additional requirement of a solutionising heat treatment after sintering.

When the sintering process is complete the magnets have rough surfaces and only approximate dimensions so require further treatment by, for example, grinding of the internal and external surfaces to produce the final finish. At this point they still exhibit no external magnetic field.

Following the finishing process, the magnet then requires magnetizing to produce an external magnetic field. This can be accomplished in a solenoid comprising a hollow cylinder into which various magnet sizes and shapes can be placed, or with other devices designed to impart unique magnetic patterns.

Thus when each individual magnet in the array is made, they can each pick up minor variations in the orientation of the direction of magnetic field. Therefore each individual ring magnet has slight imperfections with respect to each other and so the axial alignment of each of the polarizations in an array with respect to the rotational axis 102 will also be imperfect (asymmetric) with respect to each other.

This is illustrated in FIGS. 3a and 3b. The largest magnetic asymmetry observed in axially magnetised permanent magnetic rings is usually a small angular error such that the magnet's axis is displaced from the rotational axis 102 by an angle of a few degrees as indicated in FIG. 3a. Depending on the quality, or grade, of the magnet the angular error, θ, can be as much as 3°. This error may be regarded as a small perturbation from the ideal axial magnetisation; in effect a transverse magnetic dipole moment 8 superimposed on the intended axial dipole moment 6 as illustrated in FIG. 3b.

In addition to the transverse dipole (first order) asymmetry, higher order asymmetries exist, for example quadrupole and hexapole asymmetries. The magnitude, or magnetic field strength, of the asymmetry usually decreases as the number of poles increases.

Where these small asymmetries occur in any of the rings 12a to 12d of the rotating magnet array 12, a time varying magnetic field is generated (the magnetic field is constant for the static magnets 14a to 14d). These 2, 4 and 6 pole asymmetries generate time varying magnetic fields at frequencies of 1, 2, 3 times the rotational speed of the pump rotor respectively.

The performance of scanning electron microscopes is highly susceptible to mechanical vibrations or stray magnetic fields emitted from turbomolecular pumps. The stray fields are known to directly interfere with the electron beam or with the instruments' electrical circuits.

One known way to overcome the above described problems of stray first and second order magnetic fields, as described in EP2705263, is by assembling the rotating magnet array for a permanent magnet bearing arrangement by a method which effectively cancels out the stray fields of each individual magnet. This is achieved by first measuring/characterising the size and phase (vectors) of at least the first and second order transverse stray magnetic fields of a plurality of magnets, namely the transverse dipole and quadrupole stray fields. Then, for at least four ring magnets individually in relation to a reference point on said ring magnets, calculating the relative angular orientation and relative magnetic polarity direction of each of said at least 4 magnets within the array such that, when the array is assembled, it will provide the minimum time-varying magnetic field. This is the optimum relative orientation of the magnets at which all of the stray fields for each of the magnets are substantially cancelled out.

However, one problem with the above described method is that many magnets have to be characterised in order to find acceptable combinations of magnets for a pump. In other words, in order to find a combination of four ring magnets for which the stray magnetic fields can be substantially cancelled out the initial characterisation of more than four magnets is needed.

It is the intention of the present invention to overcome the above mentioned problems

SUMMARY OF THE INVENTION

In a first aspect the present invention provides a single piece elongate permanent ring magnet for a magnetic bearing arrangement having, in use, an axis of rotation parallel with, and centrally through the bore of the ring magnet, wherein the magnet comprises an even number of axially polarized zones between the axial ends of the magnet, with axially neighbouring polarized zones in mutual repulsion to each other.

Thus a single piece ring magnet with an even number of axially polarized zoned is provided for the rotating element of the bearing arrangement instead of the array of separate ring magnets described above for the prior art. The axially polarized zones each act as separate magnets, or sub-ring magnets, and are formed during manufacture of the magnet along the axial length of the single piece magnet such that they are in mutual repulsion with each other; that is neighbouring sub-magnets in an array meet their nearest neighbouring sub-magnet in the array with the same magnetic pole (north-north, or south-south). The single piece magnet substantially reproduces the magnetic field of an array of an even number of magnets, but with reduced stray field effects.

The single piece magnet of the present invention overcomes the issues described above for a magnet array formed of four separate ring magnets because removal of the relative asymmetries between magnets created when manufacturing all the magnets separately. Asymmetries, and thus transverse fields, can arise due to slight variations in either the aligning field applied during the pressing stage, or errors in the sintering or finishing processes (grinding/milling the surfaces of the sintered magnets). By providing a one piece magnet any angular asymmetry from the axial magnetization (as in the angular error, θ) is equal along the whole length of the magnet for all of the axially polarized zones. Thus, assuming all of the axially polarized zones are of equal magnetic strength, the net transverse field about the rotational axis is zero.

Further aspects of the invention are set out in the claims.

BRIEF DESCRIPTION OF THE DRAWINGS

In order that the present invention may be well understood embodiments thereof, which are given by way of example only, will now be described with reference to the accompanying drawings, in which:

FIG. 1 is a cross section of a turbomolecular pump of the prior art;

FIG. 2 is a cross sectional illustration of a passive magnetic bearing arrangement for a turbomolecular pump of the prior art;

DETAILED DESCRIPTION OF THE INVENTION

Figure 3A:
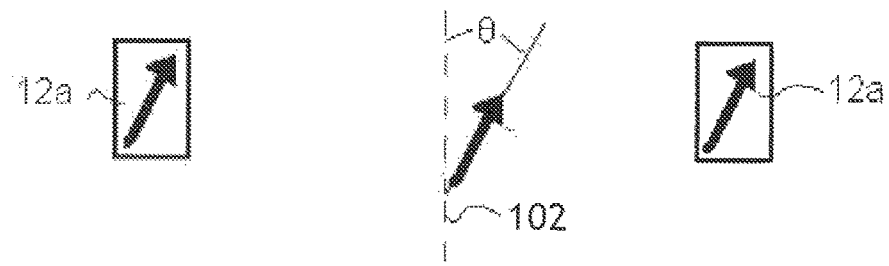
FIG. 3a is an illustration of the asymmetric magnetisation of a permanent ring magnet of the prior art.
Figure 3B:
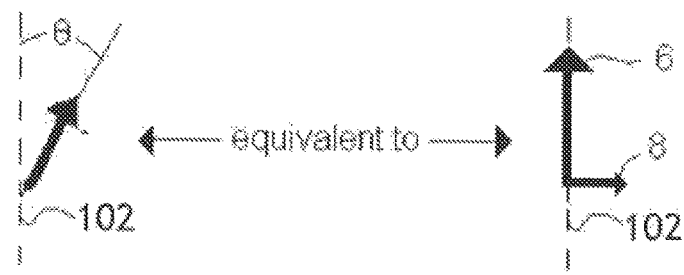
FIG. 3b is an illustration of the asymmetric magnetisation of a permanent ring magnet of the prior art.
Figure 4:
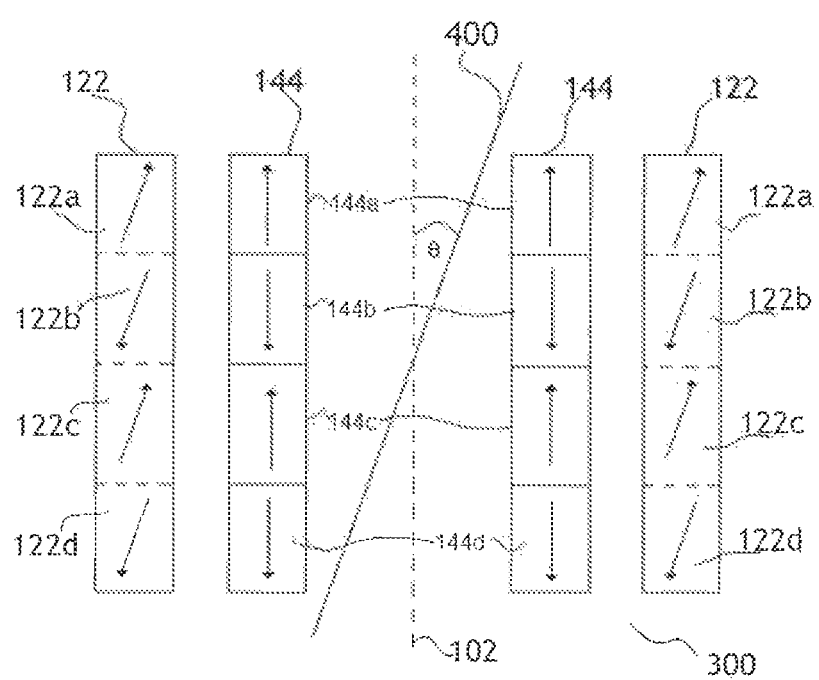
FIG. 4 is an illustration of a magnetic bearing arrangement comprising the magnet according to the invention.

FIG. 4 illustrates a magnetic bearing arrangement 300 comprising the ring magnet 122 according to the present invention. The ring magnet 122 is a single piece cylindrical tubular magnet formed of a magnetic material, for example samarium-cobalt. When in use in the bearing arrangement 300 the magnet 122 rotates with the rotor of a turbomolecular pump (not shown) about the axis 102. The axis 102 passes parallel to and centrally through the bore of the magnet 122 as shown. The magnet illustrated has four axially polarized zones 122a, 122b, 122c and 122d with axially neighbouring polarized zones in mutual repulsion to each other, for example zones 122a and 122b meet each other with the same pole (south-south, as indicated by the tails of the arrows) as do 122b and 122c (North-North as indicated by the heads of the arrows).

As stated above, the advantage of producing a single piece ring magnet comprising an even number of axially polarised zones, compared to the use of separate ring magnets in an array 12 as shown in FIG. 2, is that there can be only one angular error, θ, from the ideal geometric (rotational) axis 102. As the angular error comes from either the compression, sintering or finishing stages of magnet production, every magnet produced will have its own errors. However, it is only possible to obtain a single, uniform angular error, θ, along the whole axial length of a single piece magnet. Thus, assuming that each of the polarized zones 122a, 122b, 122c, and 122d are of equal magnetic strength, the net transverse dipole moment along a single piece magnet 122 will be zero (as shown by the line 400 in FIG. 4).

Although the magnet 122 is illustrated with 4 axially polarized zones, it may have any even number of axially polarized zones, for example 6, 8 10 12, according to the requirements of the particular bearing arrangement. The important feature is that there must be an even number of axially polarized zones for there to be a zero net transverse dipole moment, and thus virtually no stray fields produced when the magnet is rotating in the bearing arrangement of a turbomolecular pump.

The magnet 122 is produced following the stages described above. However in order to produce a plurality of axially polarized zones, once the single piece magnet has been compressed in the aligning field to the desired shape, sintered and finished it is advantageous to charge the magnet to produce each of the polarized zones 122a, 122b, 122c and 122d simultaneously. In order to do this the as yet uncharged zones 122a', 122b', 122c' and 122d' (not shown) should each be surrounded by its own solenoid designed to axially polarize said zones. Ideally a solenoid is also placed into the internal bore of the magnet 122 so that each zone 122a', 122b', 122c' and 122d' has its own solenoid pair charging it. The solenoids/solenoid pairs preferably create each axially polarized zone to be of the same magnetic strength.

FIG. 4 also illustrates the relative position of the stationary, non-rotating magnet 144 of the bearing arrangement 300, i.e. the non-rotating magnet 144 is surrounded concentrically by the magnet 122. The magnet 144 can either be formed from an array of separate, axially polarized ring magnets as in the prior bearing arrangement (shown in FIG. 2) or also formed from a single piece magnet comprising an equal number of polarized zones (144a, 144b, 144c, and 144d) to that of the rotating magnet 122. However, it is preferable to use a single piece magnet for both the rotating and stationary magnets 122, 144 because, in addition to the reduced stray magnetic fields, they are also mechanically stronger, require less manufacturing time, and are easier to handle than two arrays of separate magnets. Thus turbomolecular pumps comprising the magnets of the present invention can be made more efficiently than previous devices.

The axially polarized zones 122a-d and 144a-d also are orientated to provide a mutual repulsion between the magnets 122, 144 and therefore create an almost frictionless bearing 300.

The bearing arrangement 300 is preferably used for the magnetic bearing of a high rotational speed machine, in particular in a turbomolecular pump to reduce stray fields in applications such as scanning electron microscopes.

The invention claimed is:

1. A bearing arrangement comprising:
a non-rotating ring magnet comprising an array of axially polarized permanent ring magnets with axially neighboring axially polarized permanent ring magnets in the array in mutual repulsion to each other;
a rotating ring magnet comprising a single elongate piece with an even number of axially polarized permanent magnetic zones between axial ends of the rotating ring magnet, with axially neighboring axially polarized permanent magnetic zones in mutual repulsion to each other;
wherein the rotating ring magnet concentrically surrounds the non-rotating ring magnet whereby, the rotating ring magnet has an axis of rotation parallel with, and centrally through a bore of the rotating ring magnet; and
wherein the axially polarized permanent magnetic zones on the rotating magnet and the array of axially polarized permanent ring magnets of the non-rotating ring magnet are orientated to provide a mutual repulsion between the rotating ring magnet and non-rotating ring magnet.

2. The bearing arrangement of claim 1, wherein the even number of axially polarized permanent magnetic zones is at least four.

3. The bearing arrangement of claim 1, wherein the bearing arrangement is included in a high speed rotation device.

4. The bearing arrangement of claim 1, wherein the bearing arrangement is included in a turbomolecular pump.

* * * * *